United States Patent [19]

Warburton, Jr. et al.

[11] 4,081,383

[45] Mar. 28, 1978

[54] ANTI-SOILING TREATMENT FOR CARPETS AND CARPET YARNS

[75] Inventors: Charles E. Warburton, Jr., Ambler; Joseph J. Benischeck, Philadelphia, both of Pa.

[73] Assignee: Rohm and Haas Company, Philadelphia, Pa.

[21] Appl. No.: 720,014

[22] Filed: Sep. 2, 1976

[51] Int. Cl.² ............. C08F 220/06; C08G 59/16; D06M 15/38

[52] U.S. Cl. ............. 252/8.6; 260/29.6 AT; 260/29.6 H; 260/836; 260/837 R; 427/386; 427/390 E; 428/265; 526/273; 526/317

[58] Field of Search ............. 526/317, 273; 260/29.6 AT, 29.6 H, 836, 837 R; 252/8.6; 428/265; 427/386, 390

[56] References Cited

U.S. PATENT DOCUMENTS

| | | | |
|---|---|---|---|
| 3,236,685 | 2/1966 | Caldwell et al. | 428/265 |
| 3,360,494 | 12/1967 | Bolinger | 252/8.6 |
| 3,377,249 | 4/1968 | Marco | 8/115.6 |
| 3,433,666 | 3/1969 | Moyse et al. | 427/390 |
| 3,444,116 | 5/1969 | Gagnon et al. | 260/29.6 N |
| 3,798,169 | 3/1974 | Dickson et al. | 252/89 |
| 3,821,147 | 6/1974 | Dickson | 260/29.6 N |
| 3,988,273 | 10/1976 | Tetsuo et al. | 526/273 |
| 4,007,305 | 2/1977 | Kakar et al. | 427/322 |
| 4,011,381 | 3/1977 | Iwasawa et al. | 526/273 |

*Primary Examiner*—John Kight, III
*Attorney, Agent, or Firm*—Patrick C. Baker

[57] ABSTRACT

Soiling resistance and soil release of carpets are improved by coating the carpets or carpet yarns prior to carpet manufacture with a polymeric material containing either (A) a blend of a methacrylic acid emulsion copolymer and an epoxy resin or (B) a methacrylic acid emulsion copolymer having epoxy monomer units therein. The copolymer in either case contains 40–75% by weight methacrylic acid and the glass transition temperature of cured coatings of the polymeric material is at least 50° C.

27 Claims, No Drawings

ANTI-SOILING TREATMENT FOR CARPETS AND CARPET YARNS

This invention relates to polymeric compositions for the treatment of carpets and carpet yarns to render the carpets resistant to soiling and to improve soil release on shampooing of the carpets.

The problems of cleanliness of carpets and apparel fabrics are significantly different. Carpets tend to be more heavily soiled and are more difficult to clean than apparel fabrics because foot traffic forces soil into the carpet surface. Moreover, carpets are not cleaned as frequently as are apparel fabrics, due to the relative inconvenience of taking up carpets for cleaning or even of shampooing in place. Accordingly, unlike apparel fabrics, which are readily laundered or drycleaned, soiling resistance in carpets is of critical concern.

Polymeric coatings have been developed as antistatic and anti-soiling finishes for textiles. U.S. Pat. No. 3,236,685 to Caldwell et al discloses the coating of textile fibers and articles with blends of polybasic acid solution polymers and polyol or polyepoxide crosslinking agents. The patent teaches that the treatment imparts anti-static properties and prevents pick-up of oily dirt during laundering of fabrics but does not teach usefulness for carpet yarns and carpets, particularly with respect to prevention of soiling of the carpets in the dry state and release of soil on shampooing. Although hard polymeric coating compositions have been developed specifically for the purpose of rendering carpets less susceptible to initial soiling, as in U.S. Pat. No. 3,433,666 to Moyse et al, the effectiveness of such treatments is largely lost after a first shampooing, and there is no significant improvement in release of soil on shampooing.

Accordingly, although an anti-soiling coating composition for carpets must cure to a high degree of hardness in order to impart resistance to initial soiling, it is also desirable that the coating composition enhance removal of imbedded soil on shampooing, and that shampooing or conditions of high humidity will not unduly reduce the soiling resistance.

According to the invention, the foregoing objects are achieved by treating the carpet or carpet yarn prior to formation of carpets therefrom, with an aqueous dispersion containing a polymeric material selected from: (A) a mixture of 1) 60–98% by weight of a water-insoluble copolymer of 40–75% by weight of methacrylic acid and 60–25% by weight of a copolymerizable monomer system, and 2) 40–2% by weight of a water-dispersible epoxy resin; and (B) a water-insoluble copolymer of 40–75% by weight of methacrylic acid, 1–25% by weight of a water-dispersible epoxy monomer, and 0–59% by weight of a copolymerizable monomer system.

It is critical for the purposes of the invention that the aqueous dispersions contain emulsion copolymers and that the emulsion copolymers have the indicated proportions of methacrylic acid. Dispersions based only upon polymethacrylic acid, polyacrylic acid or low molecular weight solution copolymers, or containing copolymers (solution, suspension, bulk or emulsion) having less than 40% by weight of methacrylic acid, are not effective. Also critical to success of the invention is epoxy functionality, either in the form of an epoxy resin admixed with the methacrylic acid copolymer or in the form of pendant epoxy in a copolymer of the methacrylic acid and other monomers, one of which includes epoxy-containing monomer. In either case, upon subsequent drying and curing of the polymeric materials, the epoxy crosslinks the methacrylic acid material to form a hard coating on the carpet yarn or carpet.

At least 90% by weight of the copolymerizable monomer system should be substantially water insoluble, that is, have a solubility of not greater than 0.1 g./100 ml. water at 25° C. If the proportion of substantially water insoluble copolymerizable monomers is less than 90% then the amount of methacrylic acid should be at leat 50% by weight of the copolymer, preferably about 60% or higher. Accordingly, the proportion of monomers containing water solubilizing polar groups, such as acrylic and methacrylic acid, certain esters thereof (such as ethyl acrylate and methyl acrylate), and amides or hydroxy substituted derivatives thereof, should be minimized.

It is also critical that cured coatings of the final polymeric materials have a glass transition temperature ($T_g$) of at least 50° C., preferably at least 80° C.

Coatings based on monomers and monomer proportions not satisfying the foregoing conditions are too hydrophilic and/or too soft for obtaining the combined soiling resistance and soil release properties of the invention.

The aqueous dispersions should contain sufficient polymeric material to deposit on the yarn or carpet at least about 0.25–10% by weight of polymer solids, based on the weight of the carpet yarn or carpet, preferably about 0.5–5% by weight. Higher amounts normally are uneconomical or have undesirable effects. For example, in certain carpet constructions add-ons of 5% or more may increase flammability, as measured by the Pill Test (DOC FF 1-70). The concentrations of polymer solids in the aqueous dispersions may vary accordingly. Generally, about 1–50% by weight of polymeric material in the aqueous dispersions will be sufficient, depending upon the conditions and mode of application, that is, whether application is by padding from a bath, kiss roll, grooved roll, pad roll, orifice, spray and the like. The concentration of polymeric material in the aqueous dispersion may also vary according to the form in which the yarn or carpet is treated. For example, saturation treatment of carpet yarn in skein form may involve lower concentrations of polymeric material than in treatment of finished carpets by spraying since contact time may be longer in skein application than in spray application.

As indicated above, while it is critical that the polymeric materials contain at least 40% by weight of methacrylic acid, the optimum proportion of methacrylic acid may vary according to comonomer components. For example, whereas 40–50% by weight of methacrylic acid would be suitable when a hard comonomer such as styrene is present, higher amounts of methacrylic acid, of the order of about 60–70%, are required in the case of a softer comonomer, such as ethyl acrylate. Generally, about 40–75%, preferably 50–70%, by weight of methacrylic acid is utilized in the copolymer.

The comonomer system utilized with methacrylic acid contains any monomers, singly or in combination, which are copolymerizable with methacrylic acid through $\alpha,\beta$-ethylenic unsaturation. These include any combination of the following monomers, of which at least 90% by weight is substantially water-insoluble: carboxylic acids and anhydrides, both monocarboxylic and polycarboxylic; esters and amides of any such carboxylic acids and anhydrides, including substituted and unsubstituted esters and amides; nitriles; vinyl monomers; vinylidene monomers; olefins (both mono-olefinic and poly-olefinic); and heterocyclic monomers. Representative monomers are acrylic acid, itaconic acid, citraconic acid, aconitic acid, maleic acid and anhydride, fumaric acid, crotonic acid, cinnamic acid, vinyl sulfonic acid, vinyl phosphoric acid, $C_1$–$C_{18}$ alkyl or cyclic esters of any of the foregoing acids such as methyl, ethyl, butyl, cyclohexyl, 2-ethylhexyl, and octadecanol acrylates and methacrylates; lauryl, tridecyl and stearyl methacrylate; hydroxyethyl and hydroxypropyl methacrylate; amides of any of the foregoing acids, such as acrylamide, methacrylamide and the N-methylol and N-methoxymethyl derivatives thereof; nitriles such as acrylonitrile and methacrylonitrile; styrene, methyl styrene, and chlorostyrene; vinyls such as vinyl alcohol, vinyl acetate, vinyl chloride, vinyl ethers, vinyl sulfides, vinyl pyridine and vinyl toluene; dienes such as isoprene, chloroprene and olefins such as ethylene, isobutylene and butadiene; vinylidene chloride; and any mixtures of two or more of the foregoing monomers.

The preferred monomers of the copolymerizable monomer system are the esters of methacrylic acid with the lower alcohols having 1–4 carbon atoms, styrene and acrylonitrile, including any mixtures of such monomers.

Although it is preferred that the methacrylic acid copolymer be linear prior to crosslinking with the epoxide functionality, monomers may be copolymerized with the methacrylic acid which are capable of self-crosslinking or which may crosslink by the addition of metal compounds or by the application of heat, provided the anti-soiling and soil release properites of the coating composition are not unduly lessened. N-methylol acrylamide and N-methylol methacrylamide are examples of monomers which impart self-crosslinking capability of the copolymers.

The water-dispersible epoxy resins useful in admixture with the methacrylic acid copolymers include any water-soluble or emulsifiable epoxy compounds containing two or more epoxy groups. Generally, these are resins of up to about 800 epoxy equivalent weight, preferably up to about 200, which may be saturated or unsaturated, aliphatic, cycloaliphatic, aromatic or heterocyclic. Such resins include epoxidized triglycerides, epoxy polyethers of polyhydric alcohols and phenols, glycidyl ethers of resins obtained by condensing an aldehyde with a polyhydric phenol, reaction products of polyhydric alcohols or phenols with a polyepoxide, polymers and copolymers of epoxy-containing monomers having at least one polymerizable ethylenic linkage, and epoxy esters of polybasic acids. Among preferred epoxy resins may be mentioned aliphatic diglycidyl ethers within the scope of Formula I below, such as ethylene glycol diglycidyl ether, propylene glycol diglycidyl ether, and trimethylene glycol diglycidyl ether. Related water-soluble or readily water-dispersible glycidyl ethers that may be used are the polyglycidyl ethers of polyhydric alcohols having two to four carbon atoms, such as of ethylene glycol, glycerol, trimethylene glycol, propylene glycol, butylene glycols, their dimers, trimers, and higher polymers and especially the water-soluble or water-dispersible glycidyl ethers having the structure of one of Formulas I, II, and III.

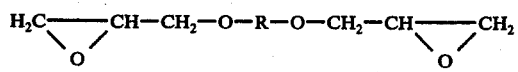

wherein R is an alkylene group of from two to six carbon atoms;

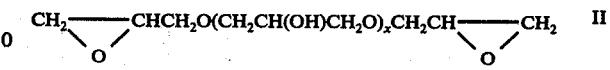

where x is a number having an average value of one to three;

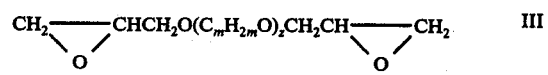

where m is an integer having a value of two to four, and z is a number having an average value of one to five. All of these polyepoxides contain at least two vic-epoxy groups in which the epoxy oxygen atom is attached to adjacent carbon atoms and have molecular weights of about 160–1000. Preferred glycidyl ethers are those having molecular weights of about 180 to 400. Other examples of epoxy resins are described in the article on epoxy resins, Kirk-Othmer, Encyclopedia of Chemical Technology, 2nd Edition, Vol. 8, pages 294–312, John Wiley and Sons, Inc., New York (1965).

A dispersing agent such as polyvinylalcohol, a polyoxyethylene sorbitan monolaurate, or an octylphenoxypolyethoxyethanol may be employed to aid in the dispersion of those epoxy compounds which are not readily watersoluble. Their solubility in aqueous systems may also be improved by the addition of a lower alcohol, such as ethanol, isopropanol, and the like. Such methods of improving dispersibility are well known.

The preferred proportion of copolymer to epoxy resin is about 70–95% copolymer to about 30–5% epoxy resin.

The methacrylic acid and monomers copolymerizable therewith are emulsion polymerized in accordance with known procedures for emulsion polymerization to provide viscosity average molecular weights of at least 1,000,000 including polymers of up to 10,000,000 molecular weight or more. The polymerization may be initiated thermally or known redox systems may be used to initiate the polymerization. Suitable initiators include hydrogen peroxide, peroxy salts such as sodium persulfate, and organic peroxy compounds such as t-butyl perbenzoate. Suitable reducing agents include sulphur dioxide, alkali metal disulphites, alkali metal or ammonium hydrogen sulphites, thiosulphate, hydrosulphite and formaldehyde sulphoxylate, and also hydroxylamine hydrochloride, hydrazine sulphate, iron(II) sulphate, tin(II)chloride, titanium (III)sulphate, hydroquinone, gluclose, ascorbic acid and certain amines such as polyalkylenepolyamines.

Polymer particle size is controlled primarily by the type and amount of emulsifier as is well known. The emulsifiers, which may be of anionic or nonionic character (or mixtures thereof) and which may be effective not only for the emulsion polymerization but also for the dispersion of the polyepoxy resins, include soaps, such as the alkali metal, ammonium and alkanolamine salts of fatty acids including sodium oleate, potassium palmitate, ammonium stearate ethanolamine laurate, and the like as well as rosin and dehydrated rosin acid soaps, and the synthetic saponaceous materials including the higher aliphatic sulfates and sulfonates such as sodium lauryl sulfate, sodium cetyl sulfate, the sodium salts of sulfonated paraffin oils, the sodium salts of dodecane-1-sulfonic acid, octadecane-1-sulfonic acid, etc., the alkaryl sulfonates such as the sodium alkyl aryl sulfonates such as sodium isopropyl benzene sulfonate, sodium isopropyl naphthalene sulfonate, the alkali metal salts of sulfonated dicarboxylic acid esters and amides such as sodium dioctyl sulfosuccinate, sodium N-octadecylsulfonsuccinamide, sulfonated or sulfated alkyl phenoxyethoxyethanols having from 1 to 50 oxyethylene units per molecule in which the alkyl has from 4 to 18 carbon atoms such as hexyl, n-octyl, t-octyl, lauryl, hexadecyl, and octadecyl, and the like. Suitable non-ionic emulsifying and dispersing agents include alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched-chain amines, such as dodecylamine, hexadecylamine, and octadecylamine, containing 6 to 60 oxyethylene groups, block copolymers of ethylene oxide and propylene oxide comprising a hydrophobic propylene oxide section combined with one or more hydrophilic ethylene oxide sections.

From ½% to 8% by weight of one or more of the above emulsifiers, based on the weight of monomers or polymer, may be present.

Suitable epoxy-containing monomers reactive with methacrylic acid and the comonomer system are those containing α,β-ethylenic unsaturation, such as glycidyl acrylate, glycidyl methacrylate, allyl glycidyl ether, 1,2-epoxy-3-allyl propane, and the like. Of the foregoing, the acrylates and methacrylates are preferred. The epoxy monomers are reacted with the methacrylic acid and other monomers of the composition in the range of about 1-25% by weight of epoxy monomer based on total monomer weight, preferably about 3-15%.

The polymeric material of the aqueous dispersion should contain unreacted carboxyl and for this reason, the ratio of equivalents of carboxyl groups to epoxy should be about 2:1 to 100:1, preferably about 4:1 to 50:1. It will be understood that with use of harder and/or more hydrophobic comonomers with methacrylic acid and/or higher amounts thereof, the amount of epoxy for optimum results will shift towards the lower end of the foregoing range.

The monomers used to form the copolymers with methacrylic acid, the monomer proportions, and the proportions of methacrylic acid copolymer and epoxy resin in the case of polymer blends, are selected such that the resulting polymeric coating has a glass transition temperature ($T_g$) of at least 50° C., preferably at least 80° C. A $T_g$ over 400° C. is not likely to be obtained in practice, although it is not excluded. The $T_g$ may be determined experimentally but may also be calculated based upon the $T_g$ of homopolymers of individual monomers as described by Fox, Bull. Am. Physics Soc., 1, 3, page 123 (1956).

Following are representative, experimentally determined $T_g$ values used to calculate $T_g$ values for polymeric coatings of this invention.

| | |
|---|---|
| polyethylacrylate | −20° C. |
| polymethylmethacrylate | 105° C. |
| polystyrene | 100° C. |
| polymethacrylic acid | 230° C. |
| polyacrylic acid | 102° C. |

The aqueous dispersions containing the polymeric materials may also contain surfactants, catalysts, initiators, activators and any other ingredients remaining from the emulsion polymerization. If desired, the aqueous dispersions may be formulated with other resins or additives to provide specialized effects. For example, the dispersions may be pigmented or may be augmented with softeners, extenders, fillers, delustrants, or the like. Also, other resinous or resin-forming materials may be added, such as aminoplast resins to reduce the possibility of removal of the coatings during shampooing or softening under conditions of high humidity. The polymeric coating materials of the invention also impart an excellent anti-static character to carpets and carpet yarns. Resistance to static buildup may be further enhanced, if desired, by admixing with the polymeric dispersion, or applying separately, known anti-stats, such as sodium polyacrylate or polymethacrylate. If desired, certain softeners, such as "Emersoft 7777" (Emery Industries, Inc.) and "Valsof FR-4" (Valchem, Chem. Division of United Merchants and Manufacturers) may be added in the coating formulation to soften the hand without adverse effect on soil resistance or soil release.

The aqueous dispersions of the invention may be applied to finished carpets in any convenient manner but preferably the dispersions are applied to carpet yarns prior to manufacture of carpets therefrom. In some cases, if the polymeric dispersion is applied to the finished carpet, it may concentrate only at the surface of the carpet with the result that the sub-surface is not rendered satisfactorily resistant to soiling. Also, with some polymers, a hard, frosty, aesthetically undesirable surface coating may result. Application to the yarns prior to formation of carpets therefrom avoids such problems since the application can be uniform over the yarns, thereby providing a protective coating throughout the carpet.

The invention is useful with any carpet yarns and carpets, whether of synthetic or natural fibers or blends thereof. Carpet yarns for which the treatment is effective include, for example, polyamides such as nylon 6 and nylon 66, polyesters, acrylics and modacrylics, rayons, acetates, olefins, spandex, glass, cotton, wool, and the like, including blends thereof. Carpet yarn deniers generally range about 800;14 8000, preferably 1000–4000, and the yarns contain 1–3 plies, each ply containing multiple continuous filaments, of the order of about 50–200. The coatings are applied to the yarn in any suitable manner and at any convenient point in the processing thereof. Preferably, the coating is applied to yarns after drawing, texturing and dyeing. Various modes of application include application to skeins of yarn by saturation in a skein dyer and centrifugation, application to yarn from a pad bath before the drier on warp dyeing or knit-deknit dyeing equipment, and application to single ends of yarn after texturing using a kiss roll, a grooved roll, an orifice or pad rolls. With respect to application to carpets, the compositions may be applied to any style carpet, whether level loop, cut pile such as shag, cut loop, and the like, by saturation in a beck dyer or spray applicator. Skein application to yarns and spray application to tufted carpets are preferred modes of application.

After the yarns or carpets are coated, the coated products are dried and then cured by heating at about 80°–200° C., preferably 120°–160° C. Curing may also occur simultaneously with other processing, such as drying and heat setting. For example, carpets are often backed with latex at about 130° C. over 10–25 minutes. These conditions would also be effective for cure of the coating composition on the carpet face.

Without intending to be limited to any one theory of action, it is believed that the improved soil resistance and soil release imported by the coatings of this invention are explainable as follows. Soil resistance is improved because soil is less likely to be embedded in the hard surface of the coating. Moreover, oily soilants have low surface energy whereas carboxyl or carboxylate groups of the polymeric coatings impart high surface energy to the coatings. Accordingly, the adhesive bond strength between oily soilants and the coatings will be low. Soil release on shampooing is believed improved by swelling of the coating in a shampoo solution according to the mechanism described by Warburton and Parkhill in Textile Chemist and Colorist 5, 41 (1973).

The following examples further illustrate the invention. All parts and percentages are by weight and $T_g$ values were calculated by the Fox method unless otherwise indicated. In these examples, the monomer and polymer abbreviations are:

MAA — methacrylic acid
AA — acrylic acid
PMAA — polymethacrylic acid
PAA — polyacrylic acid
MMA — methyl methacrylate
EA — ethyl acrylate
St — styrene
DAP — diallylphthalate

EXAMPLE 1

A. Preparation of Emulsion Polymer and Coating Composition

A 20 parts by weight mixture of 68.5 parts methacrylic acid, 26.5 parts styrene and 5 parts methyl methacrylate was added to 80 parts of water containing 0.0161 parts of 53% active diisopropylbenzenehydroperoxide (DIBHP), 0.742 parts of a 23% solution of sodium dodecylbenzenesulfonate, 0.0375 parts of the sodium salt of ethylene diamine tetraacetic acid, and 0.0135 parts of $FeSO_4 \cdot 7H_2O$. The resulting emulsion was degassed by stirring under nitrogen for 30 minutes. Then, 0.0104 parts of sodium sulfoxylate formaldehyde in 1.15 parts of water was added. The temperature rose from 23° C. to 50° C. over 30 minutes. The product was chased with 0.019 parts of 53% active DIBHP and 0.0104 parts of sodium sulfoxylate formaldehyde in 1.15 parts of water. Sodium dodecylbenzenesulfonate solution (23%), 0.374 parts, was post-added for improved shelf stability. Conversion was 99.5% and viscosity of the emulsion polymer was 50 cps (Brookfield viscometer, spindle 1, 20 rpm).

The polymer emulsion, 20%, solids, was added to a Waring Blendor and agitated. Epoxy resin ("Epon 812", Shell Chemical Compound) in the desired proportion (see Tables following Example 2) was then added slowly over several minutes. The blend was diluted with water to the solids level required to achieve the desired add-on of polymer to carpet yarn.

B. Yarn Treatment

A skein of nylon 6 yarn (scoured, undyed) was soaked in the polymer emulsion until wet out and was then squeezed to a specified wet pickup. For example, yarn soaked in a 3.33% solids bath and squeezed to 180% wet pickup would have a 6% dry coating add-on. The wet yarns were then dried and cured in a laboratory oven at 120° C. for 30 minutes followed by 150° C. for 5 minutes.

The coated yarns were tufted into polypropylene or nonwoven backing, 8 or 10 tufts/inch, using an 8 gauge machine to give a ¼ inch level-loop carpet having a face weight of 20 oz./yd.² The carpet sample was back-coated and dried 25 minutes at 120° C.

EXAMPLE 2

Laboratory Testing of Carpet Samples

Carpet samples, treated with coating compositions as in Example 1, as well as with other polymer coating compositions prepared essentially as described in Example 1 (except where indicated), were tested for anti-soiling properties as follows.

In order to reduce variations resulting from differences in soil, carpet samples were prepared with strips of coated yarn tufted side-by-side so that they would receive simultaneous exposure to the same soil. The carpet samples were cut to a size of 7⅜ in. by 27½ in., with the long direction running across the strips, preconditioned to 70° F. and 65% relative humidity, and placed in a Tetrapod Walker [Courtaulds Engr. Ltd., Coventry, England, as further described by Laughlin and Cusick, Textile Research J., 37, 608–612 (1967)] with 8 g. of household vacuum cleaner soil. The soil was enclosed in a tricot acetate fabric to provide gradual release during the soiling period. The soiling which occurred after 60,000 revolutions of the Tetrapod Walker was measured (after vacuuming) in terms of reflectance, using a Photovolt reflectometer with a green tristimulus filter and a cover glass to allow the pile to be compressed into a single plane. Reflectance was converted to the ratio of the Kubelka-Munk absorption (K) and scattering (S) coefficients by the formula: $K/S = (1-R)^2/2R$. The difference, $\Delta K/S$, for soiled and unsoiled carpet samples was then calculated. Values of $\Delta K/S$ were also determined on the carpet samples after the soiled samples were shampooed. The carpet samples were shampooed with a commercial carpet cleaning machine using a 1.6% aqueous solution of "Spectacle" Shampoo (BASF-Wyandotte Corp.) at 85° C. The test series included repeated soiling and shampooing to test resistance of the coating to washing off and the effect on resoiling and further soil release.

The results are tabulated below, wherein ΔK/S values lower than those of the controls (uncoated carpet samples) indicate improved soil resistance or soil release. Differences in ΔK/S corresponded to differences in subjective visual rankings. The coating composition described in Example 1 appears as polymer composition 1(f) in Table I, 3(f) in Table III and 4(g) in Table IV. Samples tested at the same time are grouped together; comparisons between groups should not be made because of differences in soiling conditions. Coating compositions representative of the invention are identified by an asterisk (*). The polymers of the coating compositions are identified below each Table. Proportions of copolymer and epoxy resin are expressed on a solids basis.

Other commercially available polyepoxides which may be used in place of Epon 812 (mixed glycidyl ethers of glycerol) in the coating compositions are the following:

D.E.R. 736, Dow Chemical Compound — diglycidyl ether of propylene glycol;

Araldite RD-2, Ciba-Geigy Corporation — diglycidyl ether of 1,4-butane diol;

ERL-4206, Union Carbide Corporation — vinylcyclohexene dioxide (1-epoxyethyl-3,4epoxycyclohexane);

ERL-4221, Union Carbide Corporation — 3,4-epoxycyclohexylmethyl 3,4-epoxycyclohexanecarboxylate.

TABLE I
EFFECT OF ACRYLIC ACID ON Δ K/S

| Test Series | 1(a) Control | 1(b) | 1(c) | 1(d) Control | 1(e) | 1(f) |
|---|---|---|---|---|---|---|
| $T_g$(° C.) | | 103 | 101 | | 102 | 181 |
| 1st soiling | 0.34 | 0.37 | 0.33 | 0.29 | 0.35 | 0.15 |
| 1st shampoo | 0.16 | 0.13 | 0.12 | 0.14 | 0.14 | 0.04 |
| 2nd soiling | 0.43 | 0.58 | 0.53 | 0.34 | 0.41 | 0.28 |
| 2nd shampoo | 0.18 | 0.18 | 0.14 | 0.14 | 0.15 | 0.06 |
| 3rd soiling | 0.41 | 0.62 | 0.58 | 0.40 | 0.54 | 0.38 |
| 3rd shampoo | 0.23 | 0.21 | 0.19 | 0.23 | 0.23 | 0.16 |
| 4th soiling | | | | 0.44 | 0.50 | 0.38 |

The yarn of this test series was nylon 6, 2 ply, 1300 total denier, Astakon cross-section.
Polymer Compositions and Add-ons:
1(b) - 90 (57AA/43MMA copolymer)/10 Epon 812, 5%
1(c) - 90 (57AA/38St/5MMA copolymer)/10 Epon 812, 5%
1(e) - 70 PAA solution polymer/30 Epon 812, 6%
*1(f) - 90 (68.5 MAA/26.5St/5MMA copolymer)/10 Epon 812, 6%

Table I shows that although emulsion copolymers with acrylic acid (1b, 1c) improve soil release on shampooing, they resoil to such an extent that the carpets are dirtier than a control. Poor results were also obtained with polyacrylic acid solution polymer (1e) but excellent results were obtained with the high methacrylic acid emulsion copolymer (1f). This is because the salts of acrylic acid are so hydrophilic that the coatings are hydroplasticized to such an extent that soil is readily embedded.

TABLE II
EFFECT OF MAA LEVEL AND COMONOMERS ON Δ K/S

| Test Series | 2(a) | 2(b) | 2(c) | 2(d) | 2(e) | 2(f) | 2(g) | 2(h) | 2(i) | 2(j) |
|---|---|---|---|---|---|---|---|---|---|---|
| $T_g$(° C.) | Control | 40 | 49 | | | 154 | 108 | 230 | | 55 |
| 1st soiling | 0.24 | 0.25 | 0.25 | 0.26 | 0.26 | 0.19 | 0.22 | 0.23 | 0.24 | 0.32 |
| 1st shampoo | 0.21 | 0.10 | 0.19 | 0.14 | 0.21 | 0.09 | 0.11 | 0.17 | 0.19 | 0.23 |
| 2nd soiling | 0.38 | 0.53 | 0.38 | 0.43 | 0.42 | 0.37 | 0.31 | 0.41 | 0.36 | 0.37 |
| 2nd shampoo | 0.27 | 0.22 | 0.31 | 0.23 | 0.34 | 0.22 | 0.17 | 0.28 | 0.26 | 0.34 |
| 3rd soiling | 0.42 | 0.57 | 0.45 | 0.49 | 0.50 | 0.48 | 0.41 | 0.48 | 0.48 | 0.52 |
| 3rd shampoo | 0.33 | 0.29 | 0.38 | 0.34 | 0.43 | 0.32 | 0.24 | 0.39 | 0.36 | 0.40 |
| 4th soiling | 0.50 | 0.67 | 0.58 | 0.59 | 0.63 | 0.54 | 0.49 | 0.57 | 0.57 | 0.60 |
| 4th shampoo | 0.40 | 0.39 | 0.48 | 0.42 | 0.53 | 0.38 | 0.32 | 0.48 | 0.45 | 0.49 |

The yarn of this test series was nylon 6, single ply, 2600 total denier, Astakon cross-section.
Polymer Compositions and Add-ons:
2(b) — 85 (60EA/40MAA/0.22 DAP)/15 Epon 812, 11%
2(c) — 85 (50EA/17MMA/33MAA)/15 Epon 812, 6%
2(d) — 85 (54EA/46MAA . $NH_3$)/15 Epon 812, 9%
2(e) — 70 (54EA/46MAA . $NH_3$)/30 Epon 812, 8%
2(f) — 85 (54MMA/46MAA)/15 Epon 812, 12%
*2(g) — 85 (68.5MAA/31.5EA)/15 Epon 812, 10%
2(h) — PMAA solution polymer, 8%
2(i) — 70 PMAA 30 Epon 812, 11%
2(j) — 85 (70 MMA/30EA)/15 Epon 812, 9%

Table II shows that copolymers with about 50% MAA (2b - 2f) are poor or marginal in performance relative to a copolymer with 68.5% MAA (2 g). It is also evident that harder MMA (2f) is superior to softer EA (2b - 2c) as comonomer. The relatively unsatisfactory performance of polymethacrylic acid solution polymer, with or without epoxy resin, is also shown (2h, 2i), as well as the poor performance of a copolymer without carboxylic acid (2j).

The higher hydrophilicity of polymer compositions 2(d), 2(e) and 2(f) apparently accounts for their poor performance.

TABLE III:
EFFECT OF EPOXY RESIN AND MAA LEVEL ON Δ K/S

| Test Series | 3(a) | 3(b) | 3(c) | 3(d) | 3(e) | 3(f) | 3(g) |
|---|---|---|---|---|---|---|---|
| | Control | | | Control | | | |
| 1st soiling | 0.30 | 0.26 | 0.28 | 0.23 | 0.24 | 0.24 | 0.22 |
| 1st shampoo | 0.22 | 0.21 | 0.18 | 0.13 | 0.11 | 0.10 | 0.07 |

TABLE III:-continued
EFFECT OF EPOXY RESIN AND MAA LEVEL ON Δ K/S

| Test Series | 3(a) | 3(b) | 3(c) | 3(d) | 3(e) | 3(f) | 3(g) |
|---|---|---|---|---|---|---|---|
| 2nd soiling | 0.42 | 0.44 | 0.39 | 0.29 | 0.30 | 0.28 | 0.24 |
| 2nd shampoo | 0.31 | 0.36 | 0.29 | 0.17 | 0.15 | 0.15 | 0.09 |
| 3rd soiling |  |  |  | 0.36 | 0.40 | 0.35 | 0.31 |
| 3rd shampoo |  |  |  | 0.27 | 0.22 | 0.22 | 0.13 |

The yarn of this test series was nylon 6, single ply, 2600 total denier,/astakon (3(a) through 3(c)) or nylon 6, two ply, 1300 total denier, trilobal (3(d) through 3(g)).
Polymer Compositions and Add-ons
3(b) - 50St/50MAA copolymer, 4%
*3(c) - 85 (50St/50MAA copolymer)/15 Epon 812, 4%
3(e) - 60MAA/35St/5MMA copolymer, 6%
*3(f) - 90 (60MAA/35St/5MMA copolymer)/10 Epon 812, 6%
*3(g) - 90 (68.5MAA/26.5St/5MMA copolymer)/10 Epon 812,6%

Table III shows the utility of epoxy resin (3c vs. 3b and 3f vs. 3e) and the advantage of higher MAA (3g vs. 3f). It will also be noted that 50 St/50 MAA (3c) improved soil resistance whereas 54 EA/46 MAA did not (2e, 2f). This is believed due to the fact that styrene is harder and more hydrophobic than EA; consequently, the polymer is less susceptible to softening.

EXAMPLE 3

FLOOR TESTING OF CARPET SAMPLES

A. Preparation of Samples

Epoxy resin was slowly added to 20% solids polymer emulsion in a suitable vessel and the mixture was homogenized. Three types of nylon 6 yarn were then coated: two 2600 total denier, single ply white yarns, one with Astakon cross-section, the other with a soil-hiding square-with-four-holes cross-section; and a 1300 total denier, three ply, Astakon cross-section, yellow yarn. Skeins of the yarns weighing 7-8 lbs. were wet-out to saturation in a tank containing its polymer mixture and centrifuged until the wet pickup fell to the level corresponding to the intended add-on. The centrifuged skeins were tumble-dried at 80° C. for 30 minutes. The coated yarns were then heat-set with steam in an autoclave over several cycles: 2 cycles at 212° F, 2 cycles at 230° F. and 2 cycles at 245° F. Each cycle was 5 minutes with 1 minute between cycles.

The coated yarns were tufted into polypropylene nonwoven backing to provide ¼-inch, 20 oz./yd.² face weight, level-loop carpet from the 2600 denier yarn; and ⅝ inch, cut-pile, 24 oz./yd.² face weight, saxony carpets from the 1300 denier yarn. The carpets were jutebacked and passed through a tenter frame at 130° C. for 10 minutes.

B. Floor Testing of Carpets

Samples of carpet 6 ft. × 3 ft. were cut, mounted on Masonite boards, and installed in a corridor of a corporate office building. The carpet samples received about 4000 treads per day and were periodically rotated through different positions in the test area. The carpet samples were shampooed and reflectance measurements made as described in Example 2. Table IV below summarizes the test results.

TABLE IV
FLOOR TEST — Δ K/S

| Test Series | 4(a) | 4(b) | 4(c) | 4(d) | 4(e) | 4(f) | 4(g) |
|---|---|---|---|---|---|---|---|
| 1st soiling | Control |  | Control |  | Control |  |  |
| 15,000 treads | 0.09 | 0.09 | 0.07 | 0.05 | 0.10 | 0.07 | 0.05 |
| 30,000 treads | 0.14 | 0.12 | 0.11 | 0.08 | 0.20 | 0.14 | 0.12 |
| 60,000 treads | 0.22 | 0.17 | 0.19 | 0.12 | 0.27 | 0.21 | 0.18 |
| 1st shampoo | 0.09 | 0.04 | 0.07 | 0.02 | 0.14 | 0.06 | 0.05 |
| 2nd soiling |  |  |  |  |  |  |  |
| 15,000 treads | 0.17 | 0.12 | 0.13 | 0.10 | 0.30 | 0.20 | 0.17 |
| 30,000 treads | 0.17 | 0.15 | 0.19 | 0.12 | 0.32 | 0.21 | 0.19 |
| 60,000 treads | 0.33 | 0.23 | 0.25 | 0.17 | 0.33 | 0.23 | 0.22 |
| 2nd shampoo | 0.06 | 0.05 | 0.06 | 0.03 | 0.23 | 0.10 | 0.09 |
| 3rd soiling |  |  |  |  |  |  |  |
| 12,000 treads | 0.06 | 0.05 | 0.06 | 0.03 |  |  |  |
| 25,000 treads | 0.19 | 0.16 | 0.18 | 0.12 |  |  |  |
| 60,000 treads | 0.27 | 0.26 | 0.24 | 0.18 |  |  |  |

The level loop carpet samples were coated with polymer compositions 4(b) and 4(d). The saxony carpet samples were coated with the polymer compositions 4(f) and 4(g). The yarns of the 4(a)–4(d) carpets were nylon 6, 2600 total denier and those of the 4(e)–4(g) carpets were nylon 6, 1300 total denier, 3 ply. The yarns of 4(a), 4(b), and 4(e)–4(g) were Astakon cross-section. The yarns of 4(c) and 4(d) were square-with-four-holes cross-section.
Polymer Compositions and Add-ons
4(b) — 85 (68,5MAA/31.5EA)/15 Epon 812, 6%
4(d) — 85 (68.5MAA/31.5EA)/15 Epon 812, 6%
4(f) — 85 (68.5MAA/31.5EA copolymer)/15 Epon 812, 6%
4(g) — 90 (68.5MAA/26.5St/5MMA copolymer)/10 Epon 812, 5%

Table IV shows the effectiveness of coatings in an actual foot-traffic soiling evaluation. It will be noted that the coatings improved the performance of soil hiding yarn (4c, 4d) as well as standard yarn (4a, 4b, 4e–4g).

EXAMPLE 4

Spray Application

Polymer compositions were diluted to 3.3% solids and applied to carpet through a spray bottle. The carpet was sprayed uniformly until the weight of liquid evolved corresponded to the desired dry add-on. Reflectance measurements were made on soiled and shampooed replicates of the carpet samples essentially as described in Example 2. The results are summarized in Table V below.

TABLE V

EFFECT OF SPRAYED COATING ON NYLON CARPET — Δ K/S

| Test Series | 5(a) | 5(b) | 5(c) |
|---|---|---|---|
| | Control | | |
| 1st soiling | 0.41 | 0.33 | 0.29 |
| 1st shampoo | 0.33 | 0.25 | 0.17 |
| 2nd soiling | 0.56 | 0.49 | 0.45 |
| 2nd shampoo | 0.47 | 0.39 | 0.33 |
| 3rd soiling | 0.67 | 0.60 | 0.58 |
| 3rd shampoo | 0.60 | 0.53 | 0.42 |
| 4th soiling | | | |

Polymer Compositions and Add-ons:
5(b) — 90 (68.5MAA/26.5St/5MMA copolymer)/10 Epon 812, 0.2%
5(c) — 90 (68.5MAA/26.5St/5MMA copolymer)/10 Epon 812, 6%

Table V shows that the 68.5 MAA/26.5 St/5MMA copolymer/Epon 812 is highly effective even when sprayed directly onto a carpet rather than onto yarn which is thereafter fabricated into a carpet.

EXAMPLE 5

Coating compositions were prepared and tested essentially as set forth in Examples 1 and 2 except for variations in monomers and monomer proportions. The results are summarized in Tables VI and VII. The coating compositions were 90/10 mixtures of copolymer and Epon 812 epoxy resin and add-on to the yarn (nylon 6, 1300 total denier, 2 ply, Astakon) was 4.5%. $T_g$ of the 60/40, 50/50, and 40/60 MAA/EA copolymers was measured by Differential Scanning Calorimetry.

TABLE VI

COPOLYMER COATINGS — EFFECT ON Δ K/S

| | MAA/EA | | | | |
|---|---|---|---|---|---|
| Test Series | 68.5/31.5 | 60/40 | 50/50 | 40/60 | |
| $T_g$(° C) | 108 | 80 | 57 | 39 | Control |
| 1st Soiling | 0.18 | 0.22 | 0.20 | 0.22 | 0.20 |
| 1st Shampoo | 0.02 | 0.04 | 0.04 | 0.13 | 0.05 |
| 2nd Soiling | 0.22 | 0.25 | 0.24 | 0.27 | 0.25 |
| 2nd Shampoo | 0.05 | 0.08 | 0.11 | 0.15 | 0.11 |
| 3rd Soiling | 0.24 | 0.31 | 0.32 | 0.34 | 0.34 |
| 3rd Shampoo | 0.06 | 0.09 | 0.10 | 0.18 | 0.11 |
| 4th Soiling | 0.20 | 0.26 | 0.27 | 0.31 | 0.30 |
| 4th Shampoo | 0.07 | 0.10 | 0.13 | 0.17 | 0.13 |

TABLE VII

COPOLYMER COATING — EFFECT ON Δ K/S

| | MAA/St/MMA | | | | | |
|---|---|---|---|---|---|---|
| Test Series | 65/30/5 | 60/35/5 | 50/45/5 | 40/55/5 | 30/65/5 | |
| $T_g$(° C.) | 176 | 169 | 156 | 143 | 132 | Control |
| 1st Soiling | 0.16 | 0.15 | 0.14 | 0.14 | 0.15 | 0.18 |
| 1st Shampoo | 0.03 | 0.03 | 0.04 | 0.04 | 0.06 | 0.05 |
| 2nd Soiling | 0.22 | 0.20 | 0.20 | 0.23 | 0.24 | 0.23 |
| 2nd Shampoo | 0.05 | 0.05 | 0.06 | 0.07 | 0.08 | 0.09 |
| 3rd Soiling | 0.23 | 0.21 | 0.22 | 0.22 | 0.24 | 0.25 |
| 3rd Shampoo | 0.06 | 0.06 | 0.07 | 0.09 | 0.08 | 0.09 |
| 4th Soiling | 0.26 | 0.27 | 0.26 | 0.26 | 0.26 | 0.27 |
| 4th Shampoo | 0.09 | 0.09 | 0.11 | 0.12 | 0.14 | 0.12 |

The data of Table VI shows that at least 50% methacrylic acid is required in the copolymer when ethyl acrylate is the comonomer in order to obtain improved soil resistance and soil release on shampooing over the control. However, when the copolymer contains a harder monomer such as styrene and/or methyl methacrylate, as in the compositions of Table VII, the lower limit of methacrylic acid in the copolymer is 40%. In either case, although soil resistance improves with increased content of methacrylic acid, selection of comonomer and proportion is important in order to obtain good soil release on shampooing as well. In all cases, including the polymer compositions of Examples 1–4 and 6, the coating composition must, on curing, have a $T_g$ of at least 50° C.

EXAMPLE 6

Coating compositions were prepared and tested for soiling resistance and soil release on nylon 6, 1300 total denier, 2 ply Astakon yarn, essentially as set forth in Examples 1 and 2 except for inclusion of the epoxy functionality into the copolymer via copolymerization rather than by admixture with an epoxy resin as in the preceding examples. Table VIII below compares ΔK/S values resulting from use of a copolymer prepared with such epoxy-containing monomer (8b), with values resulting from use of a copolymer/epoxy resin blend (8c). Since the results are substantially equivalent, it is evident that epoxy may be incorporated into the coating composition polymers by either route.

TABLE VIII

| | Δ K/S | | |
|---|---|---|---|
| Test Series | 8(a) | 8(b) | 8(c) |
| | Control | | |
| 1st Soiling | 0.29 | 0.17 | 0.20 |
| 1st Shampoo | 0.14 | 0.05 | 0.06 |
| 2nd Soiling | 0.34 | 0.27 | 0.28 |
| 2nd Shampoo | 0.14 | 0.08 | 0.07 |
| 3rd Soiling | 0.40 | 0.42 | 0.42 |
| 3rd Shampoo | 0.23 | 0.18 | 0.15 |
| 4th Soiling | 0.44 | 0.39 | 0.41 |

Polymer Compositions and Add-ons:
8(b) — 68.5 MAA/26.5St/5 glycidyl methacrylate, 6% add-on
8(c) — 90 (65MAA/30St/5MMA copolymer)/10 Epon 812,

EXAMPLE 7

Coating of Polyester Yarn

A coating composition was prepared and tested essentially as described in Examples 1 and 2 except that polyester yarn (4400 total denier, 20 filament BCF) was substituted for the nylon yarn. The results (Table IX) show that effective soiling resistance and soil release were imparted to the yarn by the treatment. The polymer composition was 6% 90(68.5MAA/26.5St/5MMA copolymer)/10 Epon 812 and add-on was 6%.

TABLE IX

| | Δ K/S | |
|---|---|---|
| Test Series | 9(a) | 9(b) |
| | Control | |
| 1st Soiling | 0.21 | 0.12 |
| 1st Shampoo | 0.13 | 0.06 |
| 2nd Soiling | 0.23 | 0.18 |
| 2nd Shampoo | 0.12 | 0.07 |
| 3rd Soiling | 0.32 | 0.27 |
| 3rd Shampoo | 0.16 | 0.16 |
| 4th Soiling | 0.29 | 0.27 |

We claim:
1. A composition for the treatment of carpets and carpet yarns to render carpets resistant to soiling and to improve soil release on shampooing, comprising an aqueous dispersion containing 1–50% by weight of a polymeric material selected from:
(A) a mixture of:
(1) 60–98% by weight of a water-insoluble copolymer of 40–75% by weight of methacrylic acid and 60–25% by weight of a copolymerizable monomer system, and
(2) 40–2% by weight of a water dispersible epoxy resin; and
(B) a water-insoluble copolymer of 40–75% by weight of methacrylic acid, 1–25% by weight of a water-dispersible copolymerizable epoxy monomer and 0–95% by weight of a copolymerizable monomer system; wherein said copolymerizable monomer system contains no methacrylic acid, the ratio of equivalents of carboxyl groups to epoxy groups is about 2:1 to 100:1, and the glass transition temperature of cured coatings of the polymeric material is at least 50° C., provided that if the proportion of substantially water insoluble monomers in the copolymerizable monomer system is less than 90%, the copolymer contains at least 50% by weight of methacrylic acid.

2. A composition as in claim 1 wherein methacrylic acid comprises 50–70% by weight of the copolymer of (A) and (B), the epoxy resin comprises about 5–30% by weight of the mixture, the epoxy monomer comprises about 3–15% by weight of copolymer (B), and the ratio of equivalents of carboxyl groups to epoxy groups is about 4:1 to 50:1.

3. A composition as in claim 1 wherein the copolymerizable monomer system of (A) and (B) comprises at least one $C_1$–$C_4$ alkyl ester of methacrylic acid, styrene, acrylonitrile, or a mixture of two or more thereof.

4. A composition as in claim 1 wherein the copolymer of mixture (A) is a copolymer of 60–70% by weight of methacrylic acid and 40–30% by weight of ethyl acrylate.

5. A composition as in claim 1 wherein the copolymer of mixture (A) is a copolymer of methacrylic acid and styrene.

6. A composition as in claim 1 wherein the copolymer of mixture (A) is a copolymer of methacrylic acid, styrene and methyl methacrylate.

7. A composition as in claim 6 wherein the monomer proportions in the copolymer are about 68.5% methacrylic acid, about 26.5% styrene and about 5% methyl methacrylate.

8. A composition as in claim 1 wherein mixture (A) contains about 70–95% by weight of said copolymer and about 30–5% by weight of said epoxy resin.

9. A composition as in claim 1 wherein the water-insoluble copolymer (B) comprises a copolymer of methacrylic acid, styrene and glycidyl methacrylate.

10. A method of imparting soil resistance and soil release properties to carpets which comprises coating carpet yarns or finished carpets with a composition comprising an aqueous dispersion containing 1–50% by weight of a polymeric material selected from (A) a mixture of (1) 60–98% by weight of a water-insoluble copolymer of 40–75% by weight of methacrylic acid and 60–25% by weight of a copolymerizable monomer system, and (2) 40–2% by weight of a water dispersible epoxy resin; and (B) a water-insoluble copolymer of 40–75% by weight of methacrylic acid, 1–25% by weight of a water-dispersible copolymerizable epoxy monomer and 0–95% by weight of a copolymerizable monomer system; wherein said copolymerizable monomer system contains no methacrylic acid, the ratio of equivalents of carboxyl groups to epoxy groups is about 2:1 to 100:1, and the glass transition temperature of cured coatings of the polymeric material is at least 50° C., provided that if the proportion of substantially water insoluble monomers in the copolymerizable monomer system is less than 90%, the copolymer contains at least 50% by weight of methacrylic acid, and curing said composition thereon.

11. A method as in claim 10 wherein methacrylic acid comprises 50–70% by weight of the copolymer of (A) and (B), the epoxy resin comprises about 5–30% by weight of the mixture, the epoxy monomer comprises about 3–15% by weight of copolymer (B), and the ratio of equivalents of carboxyl groups to epoxy groups is about 4:1 to 50:1.

12. A method as in claim 10 wherein the copolymerizable monomer system of (A) and (B) comprises at least one $C_1$–$C_4$ alkyl ester of methacrylic acid, styrene, acrylonitrile, or a mixture of two or more thereof.

13. A method as in claim 10 wherein the copolymer of mixture (A) is a copolymer of 60–70% by weight of methacrylic acid and 40–30% by weight of ethyl acrylate.

14. A method as in claim 10 wherein the copolymer of mixture (A) is a copolymer of methacrylic acid and styrene.

15. A method as in claim 10 wherein the copolymer of mixture (A) is a copolymer of methacrylic acid, styrene and methyl methacrylate.

16. A method as in claim 15 wherein the monomer proportions in the copolymer are about 68.5% methacrylic acid, about 26.5% styrene and about 5% methyl methacrylate.

17. A method as in claim 10 wherein mixture (A) contains about 70–95% by weight of said copolymer and about 30–5% by weight of said epoxy resin.

18. A method as in claim 10 wherein the water-insoluble copolymer (B) comprises a copolymer of methacrylic acid, styrene and glycidyl methacrylate.

19. Carpet yarn or carpeting coated with a polymeric material selected from (A) a mixture of (1) 60–98% by weight of a water-insoluble copolymer of 40–75% by weight of methacrylic acid and 60–25% by weight of a copolymerizable monomer system, and (2) 40–2% by weight of a water dispersible epoxy resin; and (B) a water-insoluble copolymer of 40–75% by weight of methacrylic acid, 1–25% by weight of a water-dispersible copolymerizable epoxy monomer and 0–95% by weight of a copolymerizable monomer system; wherein said copolymerizable monomer system contains no methacrylic acid, the ratio of equivalents of carboxyl groups to epoxy groups is about 2:1 to 100:1, and the glass transition temperature of cured coatings of the polymeric material is at least 50° C., provided that if the proportion of substantially water insoluble monomers in the copolymerizable monomer system is less than 90%, the copolymer contains at least 50% by weight of methacrylic acid.

20. Carpet yarn or carpeting as in claim 19 wherein methacrylic acid comprises 50–70% by weight of the copolymer of (A) and (B), the epoxy resin comprises about 5–30% by weight of the mixture, the epoxy monomer comprises about 3–15% by weight of copolymer (B), and the ratio of equivalents of carboxyl groups to epoxy groups is about 4:1 to 50:1.

21. Carpet yarn or carpeting as in claim 19 wherein the copolymerizable monomer system of (A) and (B) comprises at least one $C_1$–$C_4$ alkyl ester of methacrylic acid, styrene, acrylonitrile, or a mixture of two or more thereof.

22. Carpet yarn or carpeting as in claim 19 wherein the copolymer of mixture (A) is a copolymer of 60–70% by weight of methacrylic acid and 40–30% by weight of ethyl acrylate.

23. Carpet yarn or carpeting as in claim 19 wherein the copolymer of mixture (A) is a copolymer of methacrylic acid and styrene.

24. Carpet yarn or carpeting as in claim 19 wherein the copolymer of mixture (A) is a copolymer of methacrylic acid, styrene and methyl methacrylate.

25. Carpet yarn or carpeting as in claim 24 wherein the monomer proportions in the copolymer are about 68.5% methacrylic acid, about 26.5% styrene and about 5% methyl methacrylate.

26. Carpet yarn or carpeting as in claim 19 wherein mixture (A) contains about 70–95% by weight of said copolymer and about 30–5% by weight of said epoxy resin.

27. Carpet yarn or carpeting as in claim 19 wherein the water-insoluble copolymer (B) comprises a copolymer of methacrylic acid, styrene and glycidyl methacrylate.

* * * * *